(12) United States Patent
Sutschek et al.

(10) Patent No.: US 8,255,140 B2
(45) Date of Patent: Aug. 28, 2012

(54) THERMAL-PROTECTION BASED ENGINE PERFORMANCE ENHANCEMENT

(75) Inventors: Robert J. Sutschek, South Lyon, MI (US); Steven J. Andrasko, Wixom, MI (US); Christopher J Kalebjian, Columbus, MI (US); Yun Xiao, Ann Arbor, MI (US); Thomas L. Bahensky, Plymouth, MI (US)

(73) Assignee: GM Global Technology Operations LLC

( * ) Notice: Subject to any disclaimer, the term of this patent is extended or adjusted under 35 U.S.C. 154(b) by 677 days.

(21) Appl. No.: 12/424,220

(22) Filed: Apr. 15, 2009

(65) Prior Publication Data

US 2010/0082221 A1   Apr. 1, 2010

Related U.S. Application Data

(60) Provisional application No. 61/101,863, filed on Oct. 1, 2008.

(51) Int. Cl.
*F02D 43/00* (2006.01)
*F02C 9/00* (2006.01)

(52) U.S. Cl. .................................................... 701/103
(58) Field of Classification Search .............. 701/103, 701/102, 115; 60/223, 243, 777, 723, 734
See application file for complete search history.

(56) References Cited

U.S. PATENT DOCUMENTS

| 5,887,419 A * | 3/1999 | Rowe et al. ........................ 60/223 |
| 6,314,735 B1 | 11/2001 | Kolmanovsky et al. |
| 7,975,489 B2 * | 7/2011 | Joshi et al. ........................ 60/777 |
| 2007/0186539 A1 | 8/2007 | Dollmeyer et al. |

FOREIGN PATENT DOCUMENTS

CN        1782354 A       6/2006

* cited by examiner

*Primary Examiner* — Hieu T Vo

(57) ABSTRACT

An engine control module includes a power module and a turbine temperature module. The power module controls engine power output based on a turbine temperature. The turbine temperature module determines the turbine temperature based on a turbine inlet temperature. The power module decreases the engine power output when the turbine temperature is greater than or equal to a predetermined threshold temperature.

21 Claims, 3 Drawing Sheets

THERMAL-PROTECTION BASED ENGINE PERFORMANCE ENHANCEMENT

CROSS-REFERENCE TO RELATED APPLICATIONS

This application claims the benefit of U.S. Provisional Application No. 61/101,863, filed on Oct. 1, 2008. The disclosure of the above application is incorporated herein by reference.

FIELD

The present disclosure relates to engine control systems, and more particularly to a thermal protection strategy based on turbine inlet temperature.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Diesel engine systems employ turbochargers to increase engine power and efficiency. Turbochargers include a turbine stage that is linked to a compressor. The turbine stage includes a turbine and receives engine exhaust gases through a turbine inlet. The exhaust gases cause the turbine to rotate at a turbine speed. The rotating turbine drives the compressor to draw in ambient air. The compressor compresses the ambient air and delivers the compressed ambient air to an intake manifold at an increased pressure called a boost pressure. Due to the increased pressure in the intake manifold, a greater mass of air enters a cylinder during an intake stroke. The greater mass of air may be mixed with a greater amount of fuel to increase engine power.

An engine controller may control the turbine speed and the boost pressure in various ways. The engine controller may decrease the turbine speed by opening a wastegate that diverts the exhaust gases away from the turbine. Alternatively, the engine controller may control vanes of a variable nozzle turbine to selectively restrict the flow of the exhaust gases through the turbine.

Turbocharger efficiency is reduced at high altitudes due to a decrease in air density. The engine controller compensates for high altitudes by increasing the turbine speed. The turbine speed is increased by increasing an exhaust pressure, which in turn increases an exhaust temperature. The increase in the exhaust temperature heats the turbine. The exhaust temperature may also increase during transient engine operations when the engine is placed under an increased load. High exhaust temperatures may damage the turbine and cause a failure of the turbocharger.

SUMMARY

An engine control module comprises a power module and a turbine temperature module. The power module controls engine power output based on a turbine temperature. The turbine temperature module determines the turbine temperature based on a turbine inlet temperature. The power module decreases the engine power output when the turbine temperature is greater than or equal to a predetermined threshold temperature.

A method comprises controlling engine power output based on a turbine temperature and determining the turbine temperature based on a turbine inlet temperature. Additionally, the method comprises decreasing the engine power output when the turbine temperature is greater than or equal to a predetermined threshold temperature.

BRIEF DESCRIPTION OF THE DRAWINGS

The drawings described herein are for illustration purposes only and are not intended to limit the scope of the present disclosure in any way.

DETAILED DESCRIPTION

Figure 1:
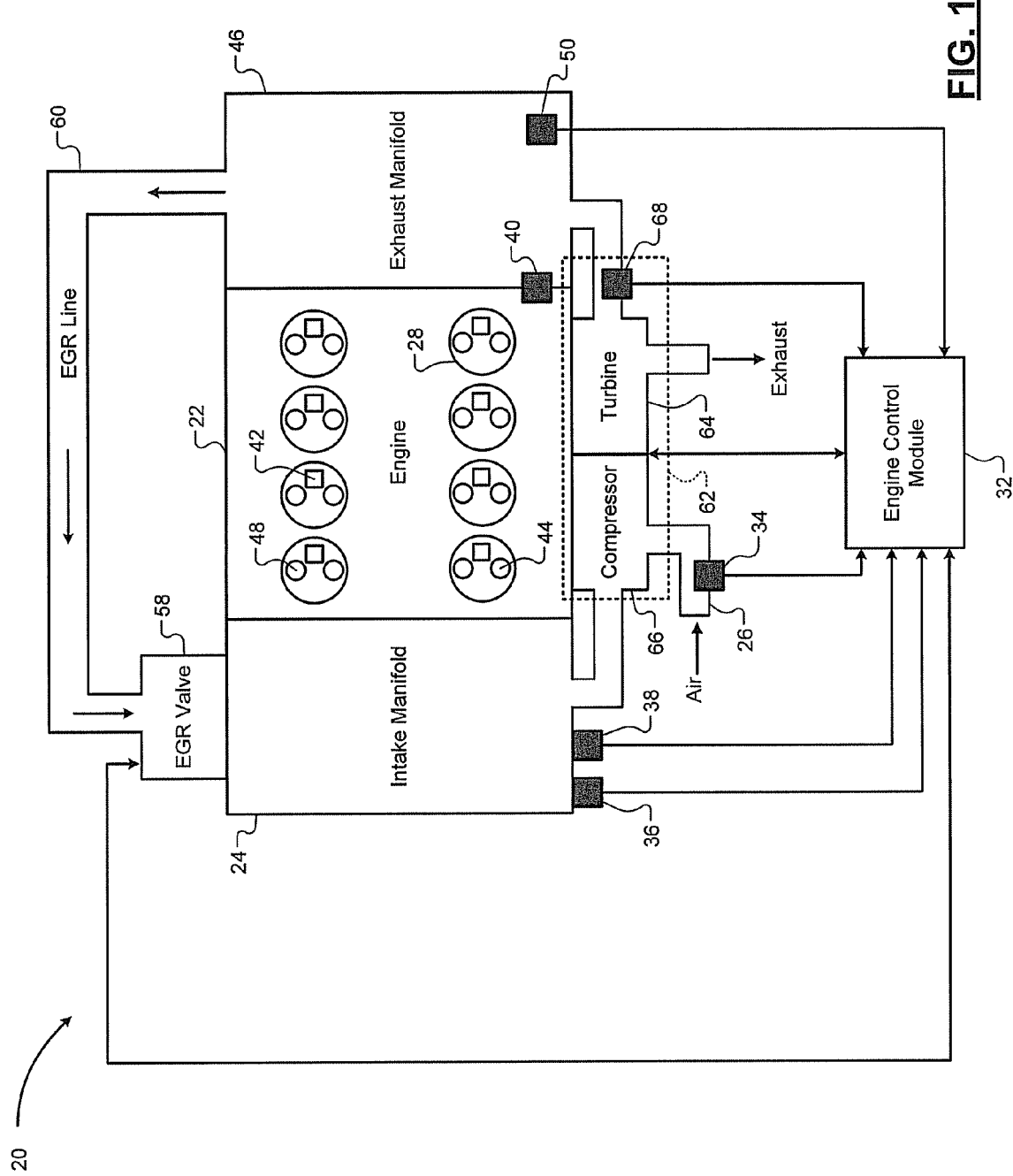
FIG. 1 is a functional block diagram of a diesel engine system according to the present disclosure.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Traditionally, the engine and the turbocharger are operated using open loop control to protect the turbine from damage due to heat. In open loop control systems, the power developed by the engine and the turbocharger is limited by a margin of error. The power limitations placed on the engine and the turbocharger during open loop control result in an incomplete use of engine system resources, particularly at high altitudes and during engine loading. The turbine protection system of the present disclosure protects the turbine by determining a turbine temperature based on sensor feedback. Using the sensor feedback, the engine and the turbocharger can be operated to deliver greater power without the risk of turbine damage.

Referring now to FIG. 1, a diesel engine system 20 includes an engine 22 that combusts an air/fuel mixture to produce drive torque. Air is drawn into an intake manifold 24 through an inlet 26. A throttle (not shown) may be included to regulate air flow into the intake manifold 24. Air within the intake manifold 24 is distributed into cylinders 28. Although FIG. 1 depicts eight cylinders, the engine 22 may include additional or fewer cylinders 28. For example, engines having 4, 5, 6, 10, 12, and 16 cylinders are contemplated.

The engine system 20 includes an engine control module (ECM) 32 that communicates with components of the engine system 20. Components of the engine system 20 may include the engine 22, sensors, and controls as discussed herein. The ECM 32 may implement the turbine protection system of the present disclosure.

Air is passed from the inlet 26 through a mass airflow (MAF) sensor 34. The MAF sensor 34 generates a MAF signal that indicates a rate of air flowing through the MAF sensor 34. A manifold pressure (MAP) sensor 36 is positioned in the intake manifold 24 between the inlet 26 and the engine 22. The MAP sensor 36 generates a MAP signal that indicates the air pressure in the intake manifold 24. A manifold air temperature (MAT) sensor 38 located in the intake manifold 24 generates a MAT signal based on intake air temperature.

An engine crankshaft (not shown) rotates at engine speed or a rate that is proportional to engine speed. A crankshaft sensor 40 senses a position of the crankshaft and generates a crankshaft position (CSP) signal. The CSP signal may be related to the rotational speed of the crankshaft and cylinder events. For example only, the crankshaft sensor 40 may be a variable reluctance sensor. The engine speed and cylinder events may be sensed by using other suitable methods.

The ECM 32 controls fuel injectors 42 to inject fuel into the cylinders 28. An intake valve 44 selectively opens and closes to enable air to enter the cylinder 28. An intake camshaft (not shown) regulates intake valve position. A piston (not shown) compresses and combusts the air/fuel mixture within the cylinder 28. The piston drives the crankshaft during a power stroke to produce drive torque. Exhaust gases resulting from the combustion within the cylinder 28 are forced out through an exhaust manifold 46 when an exhaust valve 48 is in an open position. An exhaust camshaft (not shown) regulates exhaust valve position. An exhaust manifold pressure (EMP) sensor 50 generates an EMP signal that indicates exhaust manifold air pressure.

The exhaust gases may be treated by a catalytic converter and a diesel particulate filter (both not shown). An exhaust gas recirculation (EGR) system, including an EGR valve 58 and an EGR line 60, may also use the exhaust gases. The EGR system may provide communication between the intake manifold 24 and the exhaust manifold 46. The EGR valve 58 may be mounted on the intake manifold 24. The EGR line 60 may extend from the exhaust manifold 46 to the EGR valve 58 providing communication between the exhaust manifold 46 and the EGR valve 58. The ECM 32 controls a position of the EGR valve 58.

The engine 22 includes a turbocharger 62. The turbocharger 62 includes a turbine 64, a compressor 66, and a turbine inlet temperature (TTI) sensor 68. The turbine 64 may be driven by the exhaust gases received through a turbine inlet. For example only, the turbine 64 may be a variable nozzle turbine. The turbine 64 drives the compressor 66 to increase airflow into the intake manifold 24. The increased airflow causes an increase in intake manifold pressure (i.e., the boost pressure). The ECM 32 controls the turbine 64 to selectively restrict the flow of the exhaust gases, thereby controlling the boost pressure. The TTI sensor 68 generates a TTI signal. The TTI signal indicates the temperature of the exhaust gases entering the turbine 64. The TTI signal may also indicate the temperature of the exhaust gases in the exhaust manifold 46.

Figure 2:
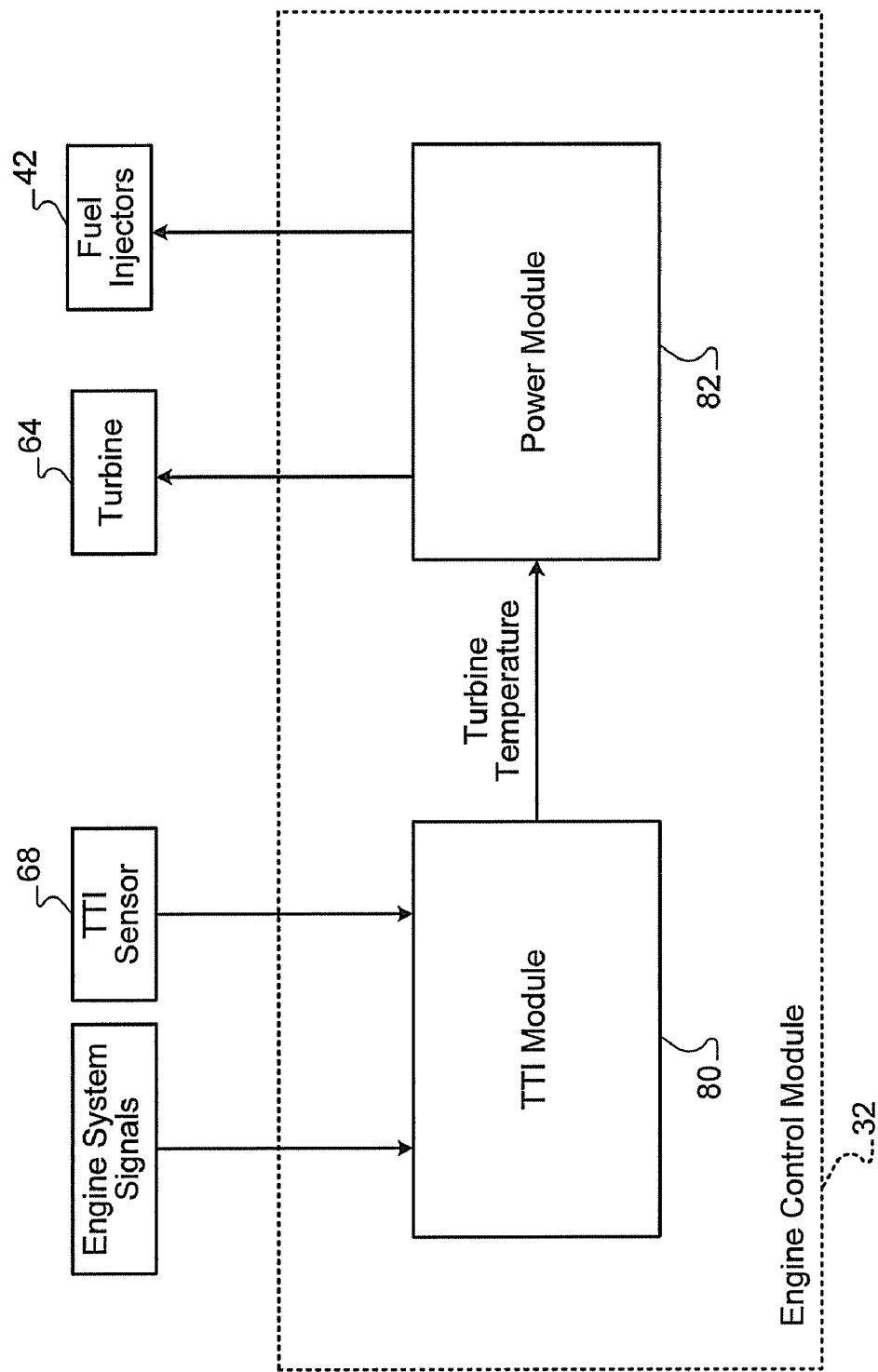
FIG. 2 is a functional block diagram of an engine control module according to the present disclosure.

Referring now to FIG. 2, the ECM 32 includes a turbine inlet temperature (TTI) module 80 and a power module 82. The ECM 32 receives input signals from the diesel engine system 20. The input signals include the MAF, MAP, MAT, CSP, and EMP signals. The input signals are hereinafter referred to as "engine system signals." The ECM 32 processes the engine system signals and generates timed engine control commands that are output to the diesel engine system 20. The engine control commands may include signals that control the fuel injectors 42, the EGR valve 58, and the turbine 64.

The TTI module 80 determines the turbine temperature based on a steady-state engine calibration and TTI signals received from the TTI sensor 68. The turbine temperature may indicate the temperature of components comprising the turbine 64. The turbine 64 may be damaged if the turbine temperature is greater than or equal to a predetermined threshold temperature. The predetermined threshold temperature is hereinafter referred to as a "turbine threshold temperature."

The steady-state engine calibration may include determining temperatures of the engine 22 and the turbine 64 at a variety of engine operating conditions (e.g., engine speed vs. engine load). The steady-state engine calibration may be based on operating the engine 22 and the turbine 64 in a thermally saturated and stable state until the turbine temperature reaches the turbine threshold temperature. The thermally saturated and stable state may include operating the engine 22 and the turbine 64 until the engine 22 and the turbine 64 have reached a stable temperature for a period of time.

The TTI module 80 may also determine the turbine temperature based on a combination of the steady-state engine calibration, the TTI signals, and the engine system signals. The TTI sensor 68 may be located in the turbine inlet. Instead of the TTI sensor 68, a TTI sensor model that simulates the functions of the TTI sensor 68 may be implemented in the TTI module 80. The TTI sensor model may be based on the engine system signals. The TTI sensor model may also be based on the steady-state engine calibration.

The power module 82 receives the turbine temperature. The power module 82 controls the turbine 64 and the fuel injectors 42 based on the turbine temperature. If the turbine temperature is less than the turbine threshold temperature, the power module 82 may increase engine 22 power by increasing fuel injection and/or boost pressure. If the turbine temperature is greater than or equal to the turbine threshold temperature, the power module 82 may decrease engine 22 power by decreasing fuel injection and/or boost pressure.

Figure 3:
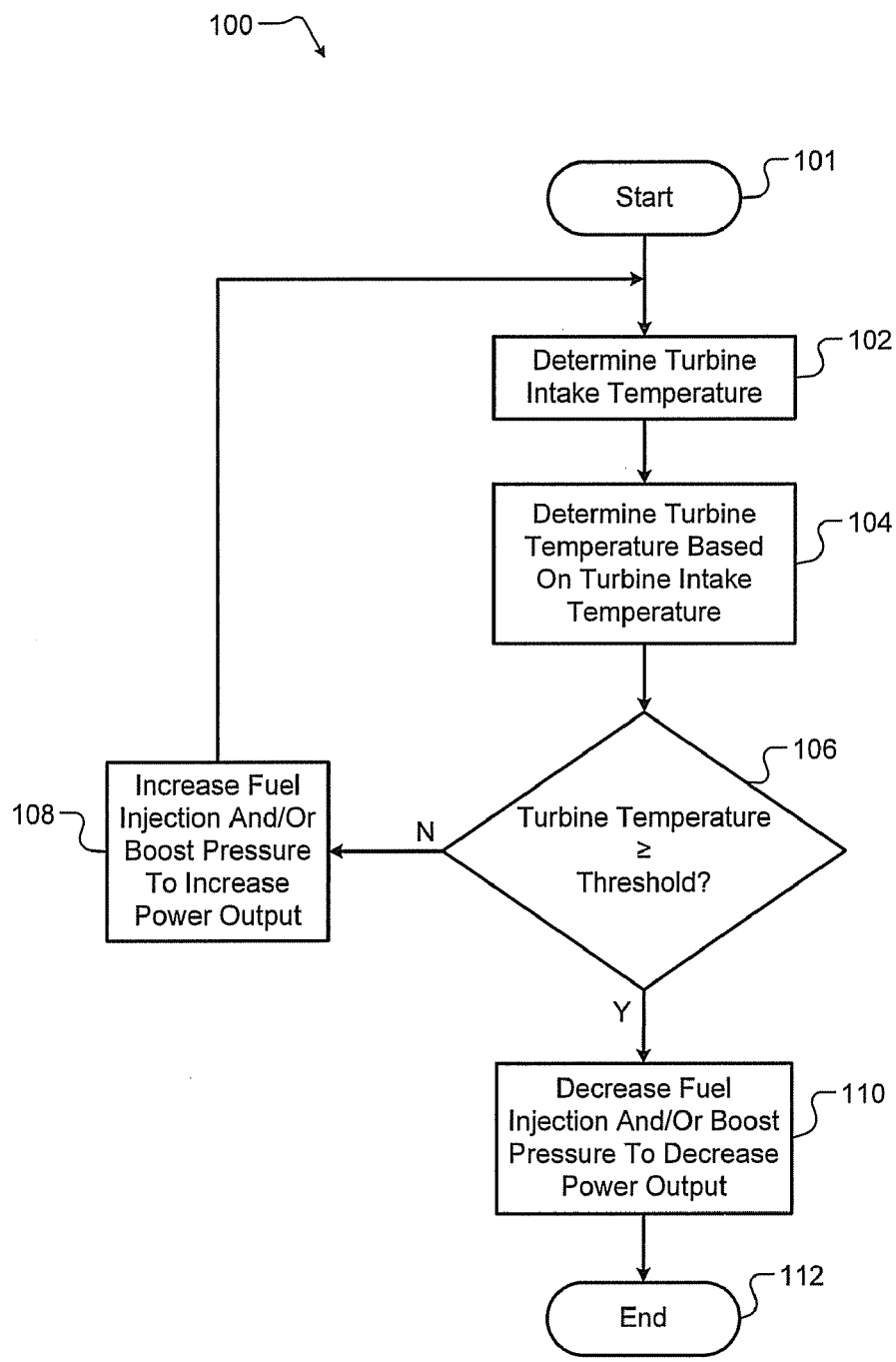
FIG. 3 is a flow diagram that illustrates the steps of a method for protecting a turbine according to the present disclosure.

Referring now to FIG. 3, a method 100 for protecting a turbine starts in step 101. In step 102, the TTI module 80 determines turbine intake temperature based on the signals received from the TTI sensor 68 and/or the TTI sensor model. In step 104, the TTI module 80 determines the turbine temperature based on turbine intake temperature. In step 106, the power module 82 determines whether the turbine temperature is greater than or equal to the turbine threshold temperature. If false, the method 100 continues to step 108. If true, the method 100 continues to step 110. In step 108, the power module 82 may increase fuel injection and/or boost pressure. In step 110, the power module 82 may decrease fuel injection and/or boost pressure. The method 100 ends in step 112.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. An engine control module comprising:
a power module that controls engine power output based on a turbine temperature; and
a turbine temperature module that determines said turbine temperature based on a turbine inlet temperature,
wherein said power module decreases said engine power output when said turbine temperature is greater than or equal to a predetermined threshold temperature.

2. The engine control module of claim 1 wherein said turbine temperature module determines said turbine temperature based on a steady-state engine calibration.

3. The engine control module of claim 2 wherein said steady-state engine calibration includes operating an engine and a turbine in a thermally saturated and stable state.

4. The engine control module of claim 1 wherein said turbine inlet temperature is sensed by a turbine inlet temperature sensor.

5. The engine control module of claim 1 wherein said turbine temperature module determines said turbine inlet temperature based on a turbine inlet temperature sensor model.

6. The engine control module of claim 5 wherein said turbine inlet temperature sensor model is based on a steady-state engine calibration.

7. The engine control module of claim 6 wherein said steady-state engine calibration includes operating an engine and a turbine at a thermally saturated and stable state.

8. The engine control module of claim 1 wherein said power module increases said engine power output by increasing fuel injection when said turbine temperature is less than said predetermined threshold temperature.

9. The engine control module of claim 1 wherein said power module decreases said engine power output by decreasing fuel injection when said turbine temperature is greater than or equal to said predetermined threshold temperature.

10. The engine control module of claim 1 wherein said power module controls said engine power output by controlling a speed of a turbine.

11. The engine control module of claim 10 wherein said turbine includes a variable nozzle turbine.

12. A method comprising:
controlling engine power output based on a turbine temperature;
determining said turbine temperature based on a turbine inlet temperature; and
decreasing said engine power output when said turbine temperature is greater than or equal to a predetermined threshold temperature.

13. The method of claim 12 further comprising determining said turbine temperature based on a steady-state engine calibration.

14. The method of claim 13 further comprising determining said turbine temperature based on operating an engine and a turbine at a thermally saturated and stable state.

15. The method of claim 12 further comprising sensing said turbine inlet temperature using a turbine inlet temperature sensor.

16. The method of claim 12 further comprising determining said turbine inlet temperature based on a turbine inlet temperature sensor model.

17. The method of claim 16 further comprising determining said turbine inlet temperature based on a steady-state engine calibration.

18. The method of claim 17 further comprising determining said turbine inlet temperature based on operating an engine and a turbine at a thermally saturated and stable state.

19. The method of claim 12 further comprising increasing said engine power output by increasing fuel injection when said turbine temperature is less than said predetermined threshold temperature.

20. The method of claim 12 further comprising decreasing said engine power output by decreasing fuel injection when said turbine temperature is greater than or equal to said predetermined threshold temperature.

21. The method of claim 12 further comprising controlling said engine power output by controlling a speed of a turbine.

* * * * *